US006761197B2

(12) United States Patent
Carra et al.

(10) Patent No.: US 6,761,197 B2
(45) Date of Patent: Jul. 13, 2004

(54) TIRE AND TREAD THEREOF

(75) Inventors: Alberto Carra, Milan (IT); Luigi Campana, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 340 days.

(21) Appl. No.: 09/843,074

(22) Filed: Apr. 27, 2001

(65) Prior Publication Data

US 2002/0033214 A1 Mar. 21, 2002

Related U.S. Application Data

(60) Provisional application No. 60/111,115, filed on Dec. 4, 1998.

(30) Foreign Application Priority Data

Oct. 29, 1998 (EP) .............................. 98830655

(51) Int. Cl.[7] ...................... B60C 11/11; B60C 11/12; B60C 11/13; B60C 115/00
(52) U.S. Cl. ........................ 152/209.18; 152/209.19; 152/209.22; 152/209.27; 152/209.28; 152/DIG. 3
(58) Field of Search .................. 152/209.18, 209.19, 152/209.22, 209.27, 209.28, DIG. 3; D12/557–567

(56) References Cited

U.S. PATENT DOCUMENTS

| | | | |
|---|---|---|---|
| 4,345,632 A | * | 8/1982 | Takigawa et al. |
| 4,641,696 A | * | 2/1987 | Semin et al. |
| 4,823,855 A | * | 4/1989 | Goergen et al. |
| 5,297,604 A | * | 3/1994 | Lurois |
| 5,385,189 A | * | 1/1995 | Aoki et al. |
| 5,549,146 A | * | 8/1996 | Trabandt et al. |
| 6,170,546 B1 | * | 1/2001 | Koyama et al. |

FOREIGN PATENT DOCUMENTS

| | | |
|---|---|---|
| EP | 0 151 966 A2 | 8/1985 |
| EP | 0 371 788 A1 | 6/1990 |
| EP | 538723 * | 4/1993 |
| EP | 0 887 209 A2 | 12/1998 |
| IT | 01245773 | 4/1991 |
| JP | 3-16810 * | 1/1991 |
| WO | WO 96/36501 | 11/1996 |
| WO | WO 98/31555 | 7/1998 |

OTHER PUBLICATIONS

Namihito, A., "Pneumatic Tire For Heavy Load", Patent Abstracts of Japan of JP No. 09156324, Jun. 17, 1997.

* cited by examiner

*Primary Examiner*—Steven D. Maki
(74) *Attorney, Agent, or Firm*—Finnegan, Henderson, Farabow, Garrett & Dunner, L.L.P.

(57) ABSTRACT

A tyre for vehicles includes a carcass structure, a belt structure, and a tread. The tread includes a row of central blocks and a row of intermediate blocks arranged on each side of an equatorial plane of the tyre between a central longitudinal groove formed astride the equatorial plane and a pair of longitudinal lateral grooves. The blocks of the central rows are separated from the blocks of the intermediate rows by circumferential sipes and are circumferentially staggered by a first predetermined quantity relative to the blocks of the intermediate rows. Also, the blocks of the central rows arranged on a first side of the equatorial plane of the tyre are circumferentially staggered by a second predetermined quantity relative to the blocks of the central rows on a second side of the equatorial plane of the tyre.

22 Claims, 5 Drawing Sheets

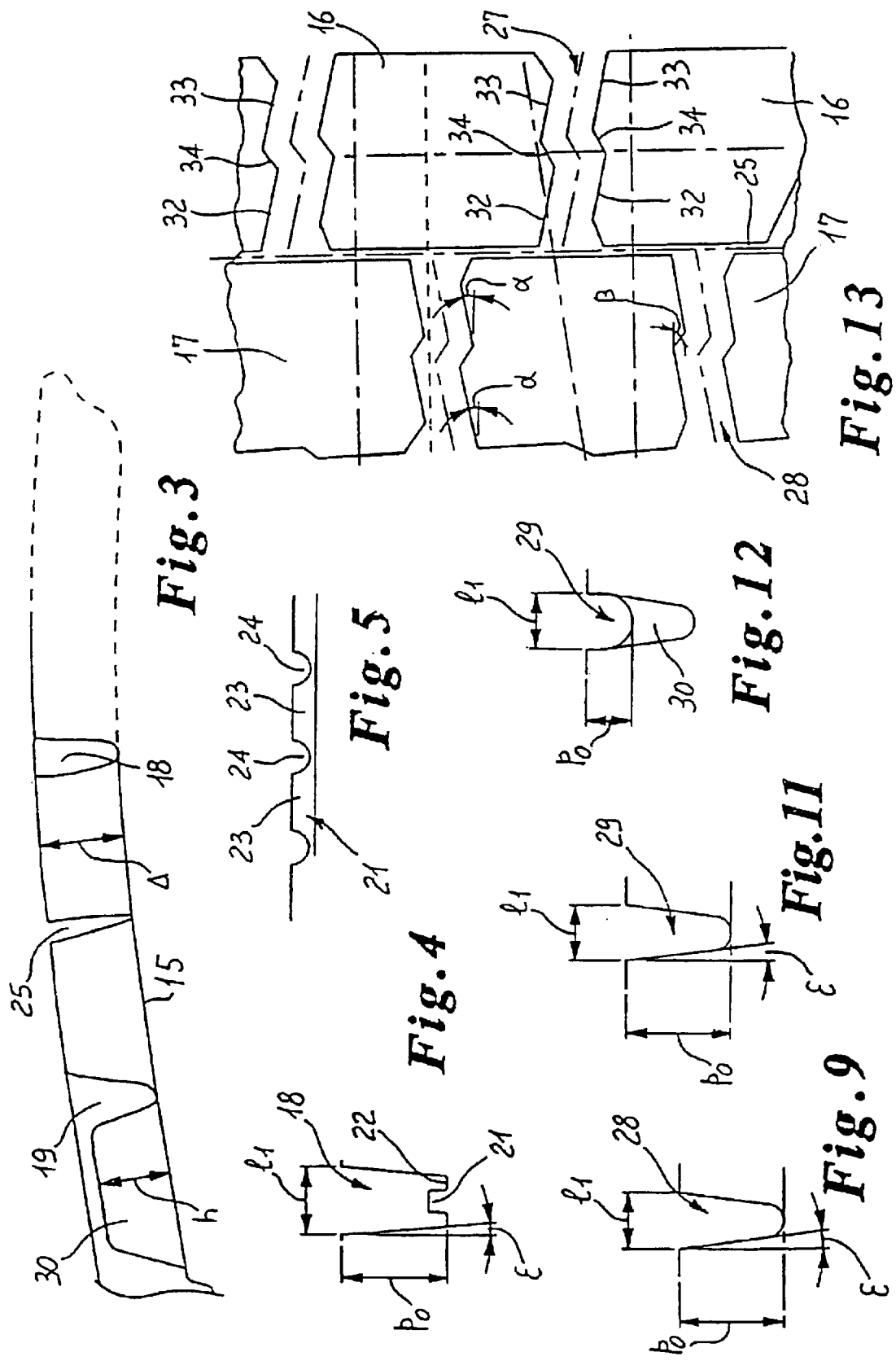

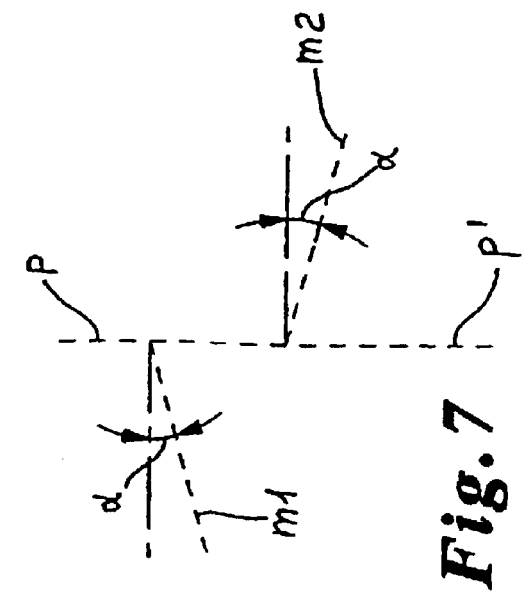
Fig. 7
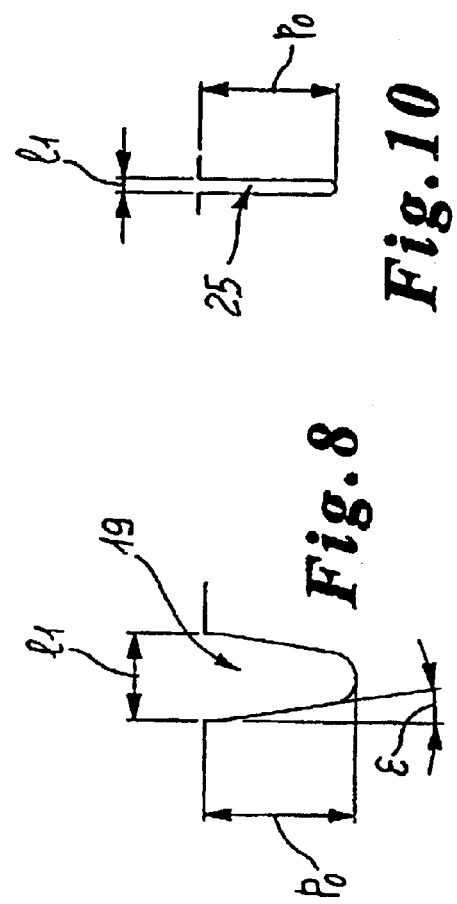
Fig. 10
Fig. 8
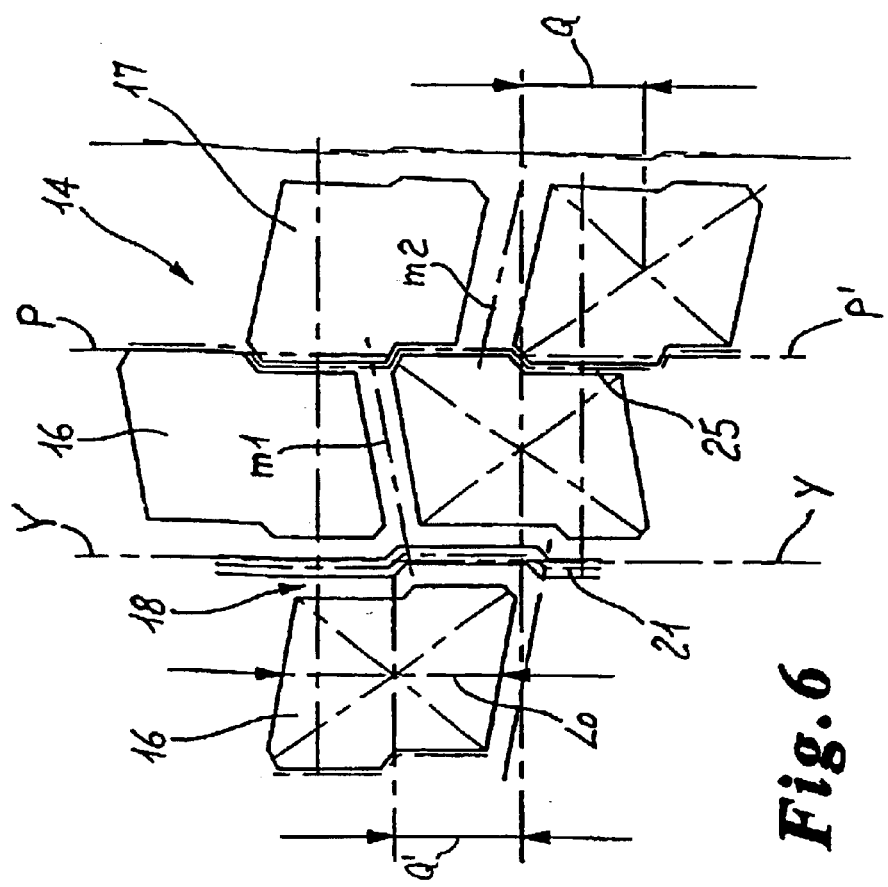
Fig. 6

TIRE AND TREAD THEREOF

CROSS-REFERENCES TO RELATED APPLICATIONS

This application is a continuation of International Patent Application No. PCT/EP99/08030, filed Oct. 22, 1999, in the European Patent Office; additionally, Applicants claim the right of priority under 35 U.S.C. § 119(a)–(d) based on patent application No. 98830655.1, filed Oct. 29, 1998, in the European Patent Office; further, Applicants claim the benefit under 35 U.S.C. § 119(e) based on prior-filed, copending provisional application No. 60/111,115, filed Dec. 4, 1998, in the U.S. Patent and Trademark Office; the contents of all of which are relied upon and incorporated herein by reference.

BACKGROUND OF THE INVENTION

1. Field of the Invention

The present invention relates to tyres for motor vehicles, in particular for lorries and heavy truck vehicles; even more specifically the invention relates to tyres with a directional tractive tread pattern, i.e. tyres suitable for the driving wheels on the rear axle of a lorry, for example of the type which may be used for travelling long distances on motorways. The tyres to be mounted on the driving axles normally have a tread with a pattern comprising a plurality of circumferential grooves intersected by transverse grooves so as to form a plurality of blocks, whence the name of "block" tyres as opposed to "ribbed" tyres formed by continuous circumferential ribs having inferior tractional properties.

2. Description of the Related Art

The tyres for the driving axles of lorries must satisfy numerous requirements.

In fact, the tyres must have good tractional power both on dry and on wet grounds and in particular on grounds covered with fresh or compacted snow.

Moreover, there is an increasing demand from the market and on the part of various legislations for low-noise tyres; the use of "block" tyres, however, generally results in a greater amount of noise than that produced by "ribbed" tyres.

The tread, moreover, must ensure good wear uniformity together with a good performance in terms of number of kilometers travelled.

According to the present state of the art, tyres which are able to deal with the abovementioned problems and offer a solution thereto already exist.

For example, the patent IT 1,245,773 in the name of the Applicants describes a tread comprising at least four rows of blocks which are delimited by at least three circumferential grooves of different width, the two narrowest of which being arranged laterally, on opposite sides of the equatorial plane of the tyre, in an axially external position, and by a plurality of inclined transverse grooves connecting pairs of adjacent circumferential grooves. In this solution, the narrow groove which separates the two lateral rows of blocks on each shoulder of the tyre is characterized by having a width not greater than 2.5 mm and a depth not greater than that of the converging transverse grooves, while the blocks of the two lateral rows are each other circumferentially staggered so that each block of each row is located alongside two consecutive blocks of the adjacent row.

Said patent describes other solutions comprising for istance two axially internal circumferential grooves delimiting a circumferential rib on the sides of which transverse grooves are formed which are similarly inclined with respect to the equatorial plane which they meet, so as to give the rib the appearance of two adjacent rows of blocks.

In effect, the rib is formed by two rows of blocks which are separated by a very narrow central groove that is aligned with the equatorial plane.

In a further embodiment the two rows of blocks of the central rib may be joined together so as to form a single row passing through the equatorial plane and, according to a further embodiment, the blocks of the central rib may be configured with substantially hexagonal shapes.

A further example of a directional tractive tyre is described in the patent application 97IT-MI00103A in the name of the same Applicants.

Said tyre has a tread comprising on both sides of the equatorial plane of the tyre a central row and an intermediate row of blocks between a central longitudinal groove formed astride the equatorial plane and a pair of longitudinal grooves.

The blocks of the central row are adjacent and not circumferentially staggered in relation to the blocks of the intermediate row.

Moreover, the blocks of the central row are separated from the blocks of the intermediate row by narrow longitudinal grooves defined as "sipes" which have a width lower than 1 mm.

Said longitudinal sipes extend circumferentially in a zigzag pattern so as to favour interlocking of axially adjacent blocks and reduce the mobility of the blocks themselves in the longitudinal direction.

The adjacent blocks of the central and intermediate rows are circumferentially separated by transverse sipes alternating with transverse grooves parallel to the transverse sipes and in turn comprising, from the bottom, further sipes.

The depth of the transverse grooves in the central rows ranges between 1 and 4 mm and in the intermediate rows between 5 and 10 mm.

Furthermore, the tread comprises shoulder blocks which are located alongside two adjacent blocks of the intermediate rows.

Said embodiment, owing to the transverse grooves which are provided at the bottom with sipes, allows suitable tractional features to be obtained owing to the presence of said transverse grooves and to a good rolling resistance which can be essentially correlated to the generally reduced mobility of the tread blocks under the tyre footprint, due to pressing of adjacent blocks against one another as a result of closing of the sipes.

SUMMARY OF THE INVENTION

Applicants' goal is to realize a tyre for lorries having a tread pattern of directional tractive type which represents an alternative to that of the cited known art, improving where possible some performance features thereof, in particular as regards silent travel and tractional power, without affecting the properties of stability.

Thus, starting from the abovementioned tread described in patent application 97IT-MI00103A, it has been developed a tread still provided with longitudinal sipes separating the central and intermediate rows arranged on either side of the equatorial plane.

In fact the small width of these longitudinal sipes, resulting in the mutual approach of central and intermediate blocks in the presence of transverse forces, allows the features of a high-rigidity rubber block to be maintained.

Therefore, it was possible to ensure transverse stability in the severest travel conditions for a lorry, for example when negotiating fast bends.

However, contrary to the teaching coming from said patent, it has been thought to circumferentially stagger with respect to one another both the blocks of each central row in relation to those of the intermediate row and the blocks of the two central rows on each side of the equatorial plane.

It is in fact considered that the simultaneous presence of said two circumferential staggered arrangements of the blocks would result in a reduction in the noisiness during the impact of the tread on the ground.

It has also been thought to achieve optimum properties of tractional power by adopting between the rows of central and lateral blocks a plurality of transverse grooves of considerable depth, i.e. with values which are substantially equal to the thickness of the tread.

It has also been thought to improve the tractional features by inclining the transverse grooves with respect to a plane perpendicular to the equatorial plane; this inclination has been achieved by making the centre lines of the transverse grooves converge in the direction of forward travel along a plane parallel to the equatorial plane.

According to a first aspect thereof, the invention relates to a tyre for vehicles, comprising:

a carcass structure including a central peripheral portion and two side-walls terminating in a pair of beads for fixing a wheel to a rim;

a belt structure coaxially associated with the carcass structure;

a tread with a predetermined thickness between the external surface and an internal surface in contact with a thin elastomeric sheet for attachment to the belt.

The tread coaxially extends around the belt structure and comprises a row of central blocks and a row of intermediate blocks, both the rows being arranged on each side of the equatorial plane of the tyre between a central longitudinal groove formed astride the equatorial plane and a pair of longitudinal lateral grooves; the blocks of the central and intermediate rows are circumferentially spaced by a plurality of first and respectively second transverse grooves extending in a direction substantially perpendicular to a predetermined direction of forward travel of the tyre, each block being formed by a pair of transverse sides, respectively a front side and rear side relative to said direction of travel, and by a pair of longitudinal sides.

The blocks of the central rows are separated from the blocks of the intermediate rows by a pair of circumferential sipes.

The tyre is characterized in that:
a) the blocks of the intermediate rows are circumferentially staggered by a first predetermined quantity Q relative to the blocks of the central rows;
b) the blocks of the central rows arranged on either side of the equatorial plane are each other circumferentially staggered by a second predetermined quantity Q';
c) the first and the second transverse grooves have centre lines converging in the direction of forward travel D on planes parallel to the equatorial plane;
d) the first and the second transverse grooves have centre lines inclined by an angle α in opposite directions to one another with respect to said planes parallel to the equatorial plane;
e) the depth of the transverse grooves is equal to at least 95% of the thickness of said tread.

In a preferred embodiment, on either side of the equatorial plane, in a position axially outside the intermediate rows, the tyre comprises a row of shoulder blocks and elastic means for connecting adjacent blocks.

Conveniently said elastic connection means consist in the presence of an elastomeric relief extending from the bottom of the groove up to a predetermined height.

Advantageously, for the purposes of improved silent performance, the tyre comprises shoulder blocks which are circumferentially staggered relatively to the blocks of the intermediate rows.

Preferably the tyre is characterized in that the first quantity Q of circumferential staggering of the blocks is between 57% and 67%.of the length of a block and the second quantity Q' of circumferential staggering of the blocks of the central rows is comprised between 56% and 66% of the length of a block.

Even more preferably the tyre is characterized in that the second quantity Q' of circumferential staggering of the blocks of the central rows is substantially equal to the first quantity Q of staggering of the blocks of the intermediate and central rows.

BRIEF DESCRIPTION OF THE DRAWINGS

Further characteristic features and advantages will emerge more clearly from the following description of a preferred embodiment of a tyre according to the invention, provided by way of a non-limiting example, with reference to the accompanying drawings, in which:

FIG. 3 shows a partial cross-sectional view of the tread according to FIG. 1, along the line (III—III) of FIG. 2;

FIG. 4 shows a cross-sectional view of the central groove of the tread of the tyre along the line IV—IV of FIG. 2;

FIG. 5 shows a detail of the central groove of FIG. 4;

FIG. 6 shows some details, on enlarged scale, of a portion of the tread according to FIG. 2;

FIG. 7 shows a detail of FIG. 6;

FIGS. 8–12 show on enlarged scale corresponding cross-sections of grooves and sipes formed in the tread of the tyre according to FIG. 1, respectively along the lines VIII—VIII, IX—IX, X—X, XI—XI, XII—XII, of FIG. 2;

FIG. 13 shows a partial plan-view of a different embodiment of the tread according to the invention;

DETAILED DESCRIPTION OF THE PREFERRED EMBODIMENTS

Figure 1:
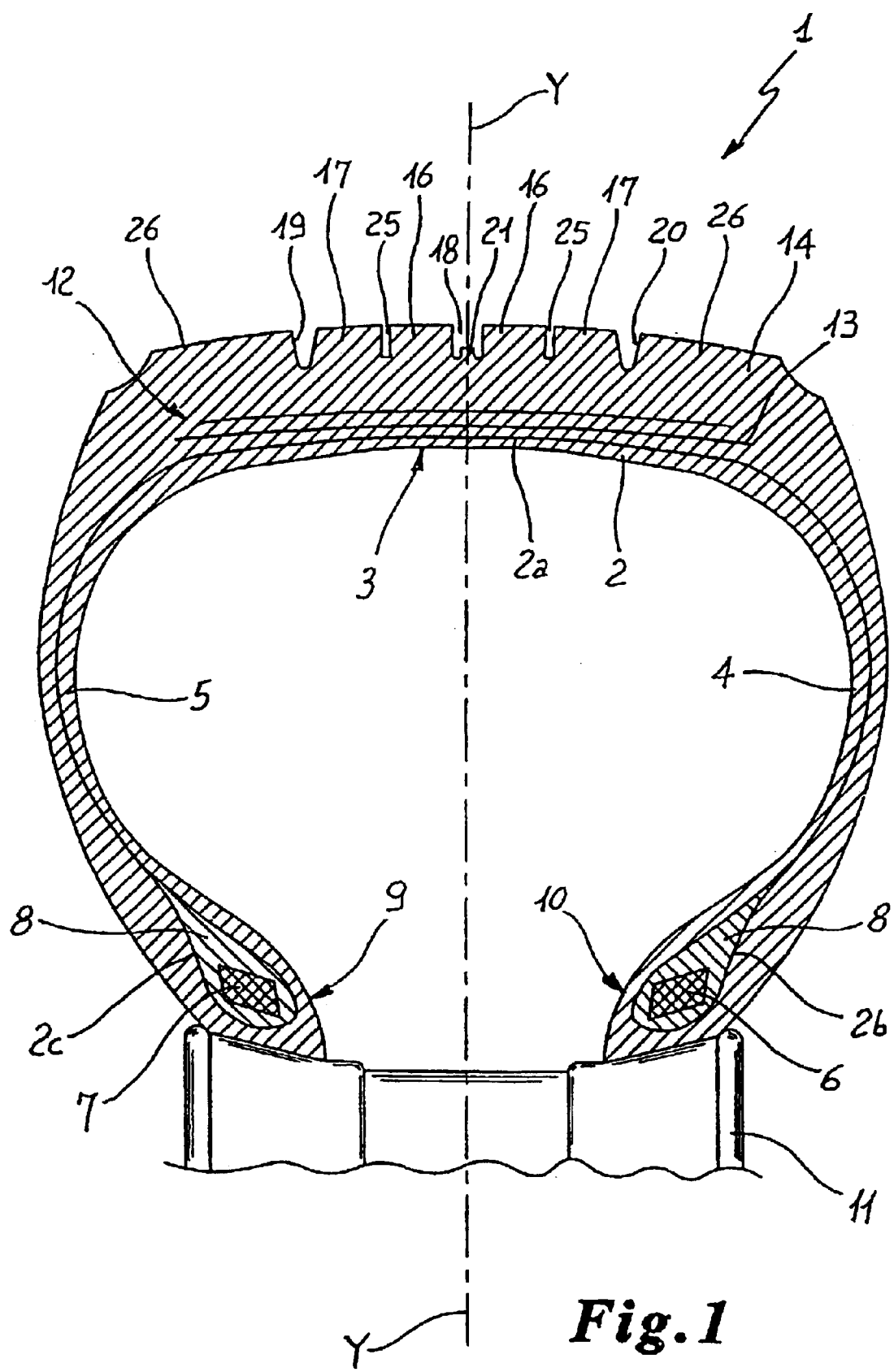
FIG. 1 shows a cross-sectional view of a tyre according to the invention.

In the Figures, reference sign 1 on the whole indicates a tyre for vehicles according to the invention, in particular a directional tractive tyre suitable for travelling long distances on motorways and suitable to be mounted on the driving wheel of a lorry or an articulated vehicle.

In particular the tyre described hereinbelow in order to illustrate the present invention with a specific example of embodiment is a tubeless tyre having size 315/80 R 22.5".

Tyre 1 comprises a carcass structure 2 which includes a central peripheral portion 3 and two side-walls 4, 5 and is provided with a reinforcing ply 2a, the opposite lateral portions 2b, 2c of which are folded back around corresponding bead wires 6,7.

A filling compound 8 is applied onto the external perimetral edge of the bead wires 6, 7 and occupies the space defined between reinforcing ply 2a and corresponding lateral portion 2b, 2c of reinforcing ply 2a.

The opposite zones of the tyre each comprising bead wire 6, 7 and filling 8 form the so-called beads—on the whole indicated with reference signs 9 and 10—which are suitable to fix tyre 1 onto a corresponding mounting rim 11 of the wheel of a vehicle.

A belt structure 12 comprising one or more belt strips 13 formed by means of textile or metal cords incorporated in a layer of rubber compound is coaxially associated with said carcass structure 2.

According to known methods, a tread 14, by means of which tyre 1 is in contact with the ground, is applied onto belt structure 12.

Tread 14 has a thickness "Δ" delimited (FIG. 3) between the external rolling surface and an internal surface which is in contact with a thin sheet of rubber compound 15 shown for the sake of simplicity as coinciding with the aforementioned internal surface of the tread.

In the case where this sheet 15 is missing, or as an alternative form of embodiment, the surface tangential to the cords of the first belt layer can be regarded as the bottom limit of the tread.

Said sheet 15 is used to ensure adhesion between the elastomeric material of the tread and the underlying belt components of the tyre.

Figure 2:
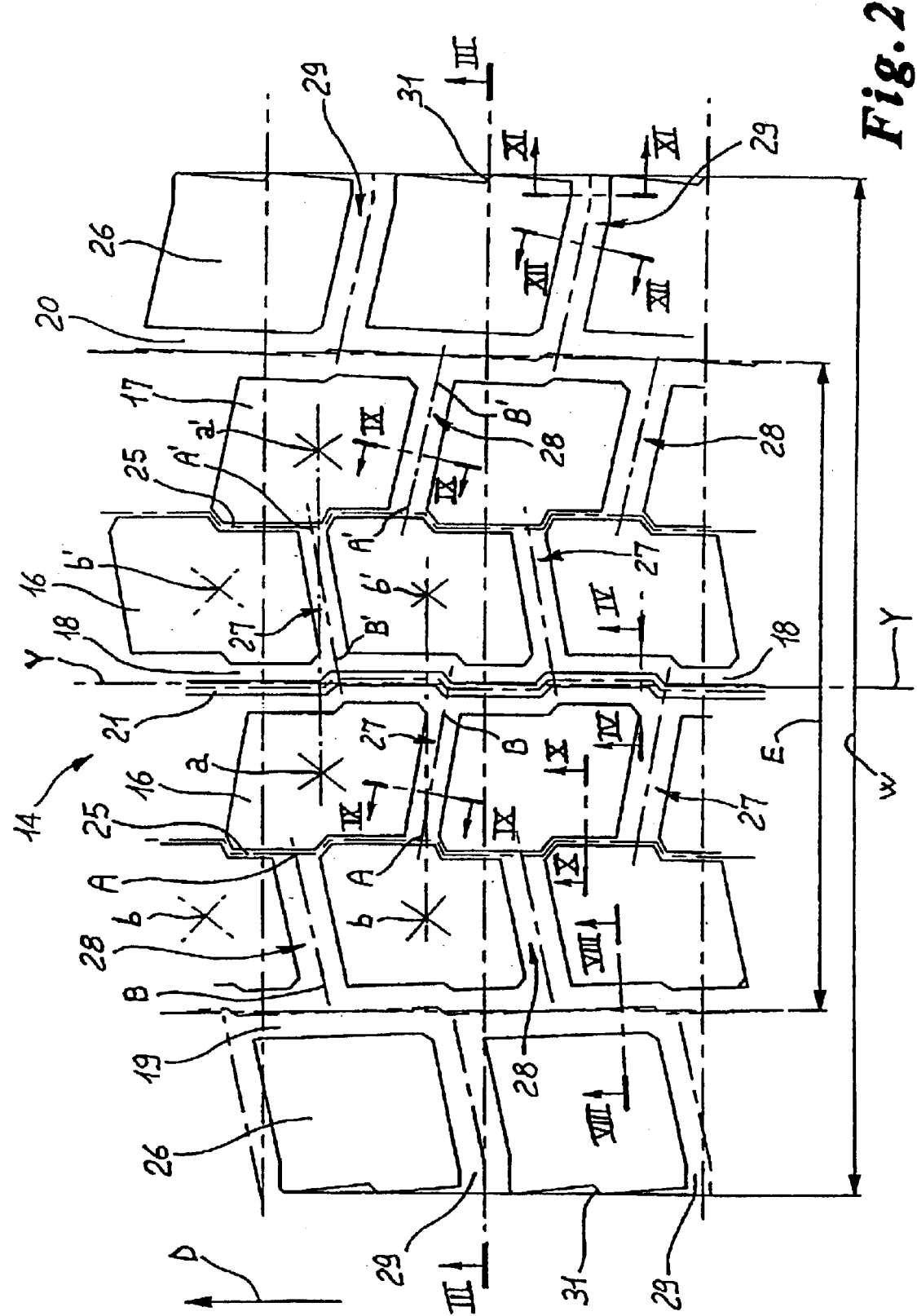
FIG. 2 shows a plan view of a portion of the tread of a tyre according to the invention.

As shown in the example of embodiment according to FIG. 2, the tread comprises a row of central blocks 16 and a row of intermediate blocks 17 arranged on each side of the equatorial plane Y—Y of the tyre between a central longitudinal groove 18, which is formed astride said equatorial plane, and a pair of longitudinal grooves 19, 20 circumferentially extending in a direction substantially parallel to the direction of forward travel of the tyre, that is indicated by arrow D.

Advantageously, longitudinal groove 18 is provided with a rib 21, extending from bottom 22 thereof, and suitable both for prevening the initiation of tears in the rubber compound at the bottom of the groove, and for protecting belt structure 12 below (FIG. 4) from damage by stones.

Preferably, as shown in FIG. 5, rib 21 is made flexible by the presence of reliefs 23 alternating with semi-circular recesses 24.

The tread is circumferentially provided with a pair of longitudinal sipes 25 extending on opposite sides of equatorial plane Y—Y of tyre 1.

Longitudinal sipes 25 separate the blocks of the central rows from the blocks of the intermediate rows. Advantageously, longitudinal sipes 25 take part both in increasing the road-holding power of the tread in the axial direction each time tyre 1 is stressed in the transverse direction with respect to the direction of forward travel D of tyre 1, and in avoiding the onset of irregular wear phenomena affecting the central and intermediate blocks.

In the embodiment according to FIG. 2, longitudinal sipes 25 extend substantially over the entire circumferencial extent of tyre 1 along a substantially zigzag path which advantageously favours the engagement of adjacent portions of central blocks 16 and intermediate blocks 17 with a further reduction in energy dissipation phenomena during rolling of tyre 1.

The tread according to the example of the description furthermore comprises two rows of shoulder blocks 26 arranged on either side of the equatorial plane, in a position axially outside the rows of intermediate blocks, from which they are separated by longitudinal grooves 19, 20.

The blocks of the central, intermediate and shoulder rows are substantially spaced by respectively first, second and third transverse grooves 27, 28, 29 which are inclined relative to the direction perpendicular to the direction of forward travel D of the tyre.

The intersection between the transverse and longitudinal grooves determines the formation of substantially polygon-shaped—in particular rhomboidal —blocks, each of which is formed by two transverse sides, respectively a front side and a rear side in relation to the direction of travel D, and by two longitudinal sides.

In accordance with a different feature of the invention, in order to provide the tyre with a high tractional power, it has been found that it is convenient to form first and second transverse grooves 27, 28 with a depth at least equal to 95% of the thickness of the tread.

In accordance with another feature of the invention, tread 14 comprises blocks of the central rows which are circumferentially staggered (FIG. 6) with respect to the blocks of the intermediate rows according to a first predetermined quantity Q circumferentially measured between the centres of two blocks belonging to axially adjacent rows.

The centre of one block is defined by the intersection of the diagonals.

Moreover, the blocks of the central rows arranged beside the equatorial plane are each other circumferentially staggered by a second predetermined quantity Q'.

Advantageously said staggered feature takes part in reducing the noisiness of the tyre during its rolling travel.

Preferably, the blocks of the central and intermediate rows have substantially the same shape and the same circumferential length and the circumferential staggering Q is comprised between 48% and 58% of length $L_o$ of a block measured circumferentially.

Moreover, mutual circumferential staggering Q' between the blocks of the two central rows alongside groove 18 is comprised between 47% and 57% of the length of a block.

Even more preferably staggering Q is the same as staggering Q'.

In particular, in the example of embodiment according to FIGS. 2 and 6, staggering Q is equal to 62% of the length of the block, the value of which in the example of the description is 42.5 mm.

In accordance with a further feature of the invention, centre lines $m_1$, $m_2$ of first and second transverse grooves 27, 28 converge, in the direction of forward travel D, with ends on plane P–P' parallel to equatorial plane Y—Y.

Moreover, centre lines $m_1$, $m_2$ of the first and second transverse grooves form (FIG. 7) angles a inclined in the opposite direction to one another with respect to said plane P–P'. Preferably, inclination values a are comprised between 10° and 15°.

Advantageously the convergency and inclination features of centre lines $m_1$, $m_2$ of the first and second grooves, together with preceding circumferential staggering features Q–Q', reduce the noisiness of the tyre during its rolling travel.

In a preferred embodiment, the central zone of the tread occupied by blocks 16, 17 of the central and intermediate rows extends (FIG. 2) astride equatorial plane Y—Y of tyre 1 over a portion of width E, which is comprised between 59% and 69% of axial extension W of the tread itself.

Width E is axially measured between the centres of longitudinal grooves 19, 20.

Preferably, in order to increase the tractional power of the tyre and to maintain a good lateral stability, it has been found to be convenient in the case of treads, for example with a thickness of about 20 mm, to form longitudinal grooves 18, 19, transverse grooves 27, 28 as well as longitudinal sipes 25 according to the dimensional values shown in the following table, in which E is defined as being the angle of the walls of the grooves with respect to the radial direction, and indicated in the cross-sectional views of FIGS. 4, 8, 9 and 10.

| Grooves | Width $l_1$ (mm) | Depth $p_o$ (mm) | Wall angles ($\epsilon°$) |
|---|---|---|---|
| longitudinal central | 13 | 19–22 | 2° |
| longitudinal lateral | 12 | 19–22 | 9.5° |
| central transverse | 8–10 | 19–22 | 6.7° |
| intermediate transverse | 8–10 | 19–22 | 6.7° |
| Longitudinal sipes | 1.8 | 19–22 | |

It has also been found to be convenient to form the rows of shoulder blocks with a particular construction comprising elastic means suitable to increase the rigidity thereof.

Preferably the abovementioned elastic means consist in the fact that each transverse groove 29 has, projecting inside of it (FIG. 3), a relief 30 extending up to a height h ranging, depending on the desired rigidity, between 50% and 85% of thickness "Δ" of the tread.

As it is clearly shown by the embodiment of FIG. 3, transverse groove 29 has a first straight portion axially inwards followed by an inclination with respect to the axial direction which is similar to that of the transverse grooves of the intermediate rows.

Transverse groove 29 has, over the first portion (Fig. 11), a width $1_1$ which is comprised between 9.8 and 10.8 mm and a considerable depth with values of between 19 and 22 nun.

Relief 30 is positioned in said inclined portion of groove 29 and has gradually rising sidewalls (FIG. 3) terminating in a central portion of constant height; in some examples the length of said end portion of relief 30 is comprised between 20 and 27 mm.

Width $1_1$ of transverse groove 29 on the rolling surface in the region of the inclined portion (FIG. 12) is preferably comprised between 8 and 11 mm.

Advantageously, blocks 26 of the shoulder rows are circumferentially staggered with respect to the blocks of intermediate rows 17 so as to take part in improving the silent travel during the rolling of the tyre on the ground.

Preferably, each of shoulder blocks 26 has, arranged alongside it, at least two blocks 17 of the adjacent intermediate row.

Moreover, shoulder blocks 26 comprise external longitudinal sides provided with facets 31 in order to take part in improving overall the tractional capacity of the tyre.

By way of an alternative to the embodiment illustrated in FIG. 2, the tread can comprise some variants including, for example, the one illustrated in FIG. 13.

Said variant consists in the fact that each of central and intermediate blocks 16,17 comprises frontal sides formed by two straight portions 32, 33 which are parallel and inclined with respect to a plane perpendicular to the direction of travel D according to the abovementioned angle "α".

The two straight portions are connected together by a third portion 34 which is in turn inclined in the opposite direction to the two intermediate portions according to an angle "β" with a value of between 30° and 40°.

This embodiment of the central and intermediate blocks results in a particularly squat shape consequently having a greater wear resistance.

The embodiment of the blocks with transverse sides consisting of a broken line may be associated with adjacent rows of blocks provided with engagement means as shown in FIG. 3.

By way of an alternative, as shown in FIG. 13, the rows of central and intermediate blocks may be each other separated by the presence of straight longitudinal sipes, instead of zigzag sipes as shown in FIG. 2.

The tyre according to the invention results in remarkable advantages.

In particular the formation of transverse grooves 27, 28 having ends converging in the direction of travel D on plane. P–P' allows safe and stable driving even on snow-covered roads.

In fact, during the rolling travel of the tyre, ends A, A' of transverse grooves 27, 28 are the first to come into contact with the ground, thus resulting in a pressure tending to cause the snow to flow towards opposite ends B,B' and from here, along longitudinal grooves 19, 20, towards the outside as soon as the latter leave the tyre footprint.

Therefore, the tread pattern according to the invention, owing to its cleaning automatic system of the transverse, central and intermediate grooves, results in remaining practically unchanged the tractional features even in the severest travel conditions such as those caused by the presence of snow.

It should also be pointed out that the tread pattern according to the invention results in a reduction in the noisiness which may be explained by means of the following considerations.

The embodiment of the pattern according to FIG. 2 shows the existence of a substantial alignment "a—a" between a central block 16 to the left of the equatorial plan e and an intermediate block 17 to the right of the equatorial plane and an alignment "b—b" between an intermediate block 17 to the left of the equatorial plane and a central block 16 to the right of the equatorial plane.

Said alignment condition "a—a", "b—b" is repeated over the whole of the tread.

Now let us assume that the moment has come where the vertices of blocks 16, 17, the centres of which are aligned along "a—a", hereinbelow indicated for the sake of commodity by a,a', touch the ground following to the rotation of the tyre.

These blocks a,a' will remain in contact with the ground together with the blocks intercalated with them and already gripping the ground, indicated hereinbelow as b—b'.

Subsequently, at about halfway along length $L_o$ of blocks a,a', the gripping line of the tyre will no longer be in contact with intercalated r blocks b,b', having encountered transverse grooves 27, 28.

Consequently, the gripping line of the tyre along central zone "E" will not simultaneously encounter all the blocks of the central and intermediate rows, but only two of them at a time, so as to reduce the noisiness due to the impact between tread and ground.

It has also been found that the particular stiffening form of shoulder blocks 26 allows to ensure the wear uniformity of central and intermediate blocks 16,17, also in the presence of the considerable depths of respective transverse grooves 27, 28.

Said result may be explained by comparing the three rows of blocks which are arranged on each side of the equatorial plane with a system of three springs arranged in parallel and subjected to a given load which is represented by the tangential forces transmitted in direction D of travel during the contact between the tyre and the ground. The greater rigidity of the shoulder blocks with respect to that of axially more internal blocks results in a greater absorption of forces by them compared to the intermediate and central blocks which are subjected to a smaller reactive load, with a consequent increase in the life of the latter.

It must also be pointed out that the greater depth of transverse grooves 27, 28 of central and intermediate rows allows to advantageously obtain optimum tractional features without affecting the wear conditions.

In fact the mobility of the blocks of the central and intermediate blocks, as a result of the greater depths of transverse grooves 27, 28, is offset by adopting means for longitudinal stabilisation of the blocks.

In the various embodiments, said longitudinal stabilisation means are obtained in different ways and more precisely:

by selecting the said greater rigidity of the shoulder blocks compared to that of the central and intermediate blocks consequently achieving the integrity of said central or intermediate blocks;

by achieving a certain longitudinal stability provided by the means for longitudinal engagement of adjacent blocks owing to the presence of the longitudinal zigzag sipes, as shown in FIG. 2;

by adopting the blocks according to FIG. 13, which are formed with a squatter shape than those of FIG. 2;

by using a particular rubber compound with a high-abrasion resistance, both on its own and in combination with one or more of the preceding features.

Few tests have been carried out on the tyre according to the invention in order to verify the quality of the performance which can be obtained when the tyre is mounted on the wheels of the driving axle with the tread pattern oriented in the direction of travel "D" first, as illustrated in FIG. 2, i.e. in the normal direction, and then in the opposite direction.

The aim of the tests was to compare the low-noise and tractional performance on snow.

Figure 14:
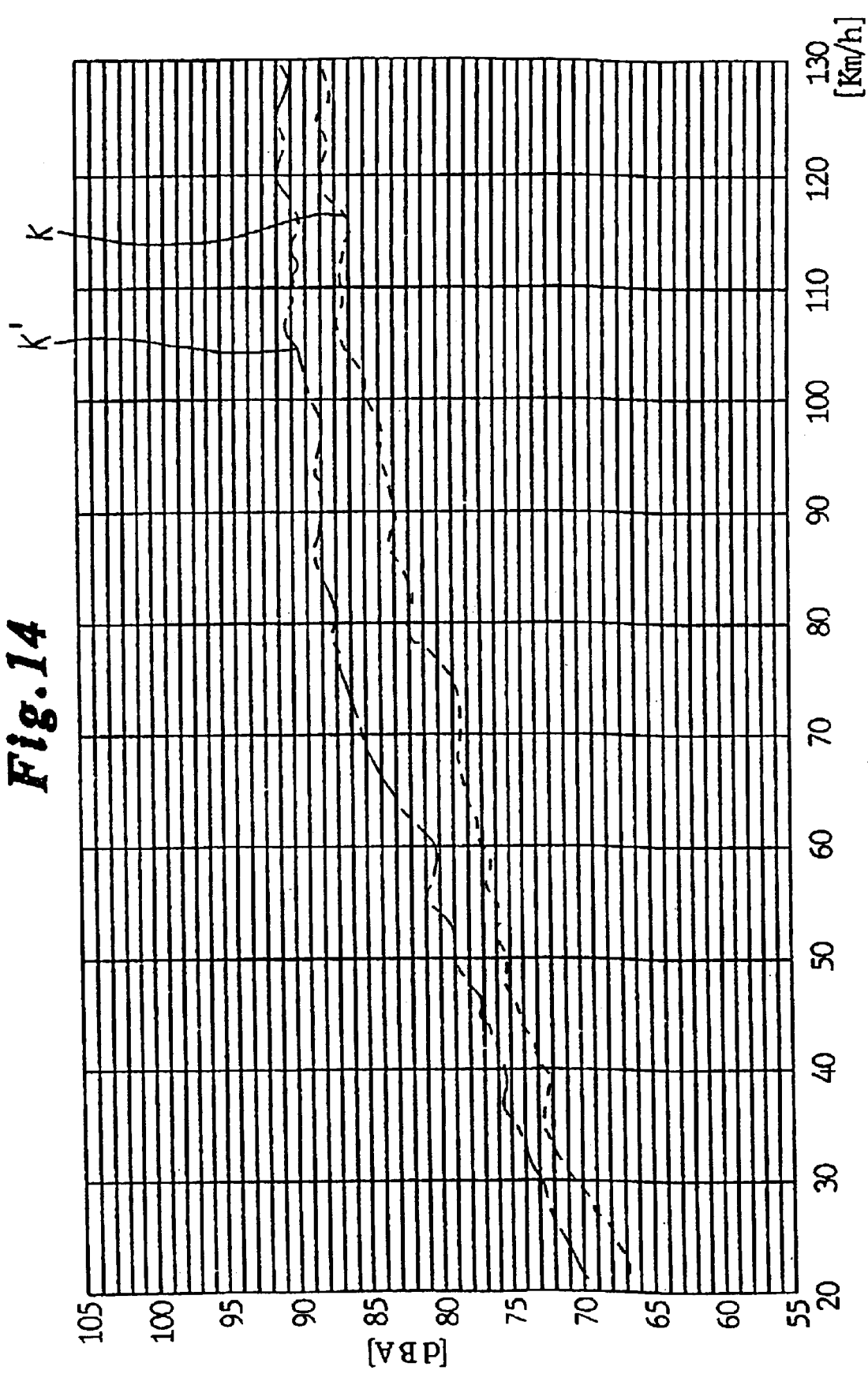
FIG. 14 shows a graph illustrating the outcome of a test carried out to check the degree of silent performance of the tread according to the invention.

The result of the low-noise test is shown in the diagram of FIG. 14, where the speed of the tyre expressed in km/h is shown along the abscissae and the noise level expressed in decibel is shown along the ordinates.

As clearly results from the diagram of FIG. 14, curve k relating to the noise level of the tyre mounted in the normal direction is advantageously always below curve k' for the tyre mounted in the opposite direction.

The tractional tests were carried out with the same static torque on fresh snow, checking the number of times that a slipping condition occurred.

The results of the test showed a reduction to about 50% of the risk of slippage of the tyre when mounted in normal direction, compared to a tyre mounted in the opposite direction.

What is claimed is:

1. A tyre for vehicles, comprising:
   a carcass structure including a central peripheral portion and two sidewalls terminating in a pair of beads for fixing a wheel to a rim;
   a belt structure coaxially associated with the carcass structure; and
   a tread with a predetermined thickness between a radially external surface of the tread and a radially internal surface of the tread in contact with the belt structure, the tread extending coaxially around the belt structure and comprising a row of central blocks and a row of intermediate blocks arranged on each side of an equatorial plane of the tyre between a central longitudinal groove formed astride the equatorial plane and a pair of longitudinal lateral grooves, the blocks of the central and intermediate rows being circumferentially spaced respectively by a plurality of first and second transverse grooves extending in a direction substantially perpendicular to a predetermined direction of forward travel of the tyre, each block being formed by a pair of transverse sides, respectively a front side and a rear side, relative to the direction of forward travel, and by a pair of longitudinal sides, the blocks of the central rows being separated from the blocks of the intermediate rows by a pair of longitudinal sipes, wherein:
   the blocks of the intermediate rows are circumferentially staggered by a first predetermined quantity relative to the blocks of the central rows;
   the blocks of the central rows arranged on a first side of the equatorial plane of the tyre are circumferentially staggered by a second predetermined quantity relative to the blocks of the central rows on a second side of the equatorial plane of the tyre;
   the first and second transverse grooves have centre lines converging in the direction of forward travel with ends on planes parallel to the equatorial plane of the tyre;
   the first and second transverse grooves have centre lines inclined in opposite directions to one another at a first angle with respect to a plane perpendicular to the equatorial plane of the tyre; and
   a depth of the first and second transverse grooves is equal to at least 95% of the thickness of the tread along the entire length of the first and second transverse grooves.

2. The tyre of claim 1, wherein a width of the transverse grooves is between 8 mm and 11 mm.

3. The tyre of claim 1, wherein a width of the longitudinal grooves is between 10 mm and 14 mm.

4. The tyre of claim 1, wherein the depth of the longitudinal lateral grooves is equal to at least 95% of the thickness of the tread.

5. The tyre of claim 1, wherein the tyre comprises, in a position axially outside the intermediate rows, a row of shoulder blocks and elastic means for connecting together circumferentially adjacent shoulder blocks.

6. The tyre of claim 5, wherein the elastic connection means consists of a relief in a transverse groove between successive shoulder blocks, the relief extending up to a predetermined height.

7. The tyre of claim 5, wherein the shoulder blocks are circumferentially staggered relative to the blocks of the intermediate rows.

8. The tyre of claim 5, wherein longitudinal outermost sides of the shoulder blocks are provided with facets.

9. The tyre of claim 1, wherein the transverse grooves form, together with a plane perpendicular to the equatorial plane of the tyre, a first angle between 10° and 15°.

10. The tyre of claim 1, wherein the first quantity of circumferential staggering of the blocks is comprised between 48% and 58% of a length of a block.

11. The tyre of claim 1, wherein the second quantity of circumferential staggering of the blocks of the central rows is comprised between 47% and 57% of a length of a block.

12. The tyre of claim 1, wherein the second quantity of circumferential staggering is substantially equal to the first quantity of circumferential staggering.

13. The tyre of claim 1, wherein the longitudinal sipes have a maximum width of 3 mm.

14. The tyre of claim 12, wherein a depth of the longitudinal sipes is between 19 mm and 22 mm.

15. The tyre of claim 1, wherein the front and rear sides of the blocks of the central row are formed by two straight portions inclined at a first angle with respect to a plane perpendicular to the longitudinal sipes and by a third intermediate spacing portion connecting together the straight portions.

16. The tyre of claim 15, wherein the third connecting portion forms a second angle with a plane perpendicular to the equatorial plane of the tyre, and wherein the second angle is between 30° and 40°.

17. The tyre of claim 1, wherein the longitudinal sipes separating the central and intermediate rows of blocks are straight.

18. The tyre of claim 17, wherein the longitudinal sipes separating the central and intermediate rows of blocks have a zigzag pattern.

19. The tyre of claim 1, wherein the central longitudinal groove has a width between 8 mm and 15 mm.

20. The tyre of claim 1, wherein a depth of the central longitudinal groove is between 19 mm and 22 mm.

21. The tyre of claim 1, wherein the central longitudinal groove is provided with a rib radially extending from a bottom thereof.

22. The tyre of claim 21, wherein the rib is formed by a plurality of reliefs alternating with recesses.

* * * * *